(12) United States Patent
Schneider et al.

(10) Patent No.: US 10,941,815 B2
(45) Date of Patent: Mar. 9, 2021

(54) CONNECTION DEVICE FOR A DRIVE TRAIN

(71) Applicant: Bayerische Motoren Werke Aktiengesellschaft, Munich (DE)

(72) Inventors: Franz Schneider, Munich (DE); Erwin Fusseder, Bodenkirchen (DE); Wolfgang Streinz, Landshut (DE); Josef Hofstetter, Wimpasing (DE); Hans Blieninger, Schalkham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 240 days.

(21) Appl. No.: 15/708,282

(22) Filed: Sep. 19, 2017

(65) Prior Publication Data
US 2018/0003244 A1 Jan. 4, 2018

Related U.S. Application Data

(63) Continuation of application No. PCT/EP2016/059745, filed on May 2, 2016.

(30) Foreign Application Priority Data

May 19, 2015 (DE) ...................... 10 2015 209 110.4

(51) Int. Cl.
*F16C 3/02* (2006.01)
*F16D 9/00* (2006.01)
(Continued)

(52) U.S. Cl.
CPC .................. *F16D 9/00* (2013.01); *F16C 3/02* (2013.01); *F16D 1/087* (2013.01); *F16D 1/0858* (2013.01); *F16D 1/10* (2013.01); *F16C 2326/06* (2013.01)

(58) Field of Classification Search
CPC ... F16D 9/00; F16D 1/10; F16D 1/087; F16D 1/0858; F16C 3/02; F16C 2326/06
(Continued)

(56) References Cited

U.S. PATENT DOCUMENTS 5,566,777 A 10/1996 Trommer et al.
6,328,656 B1 12/2001 Uchikawa et al.
(Continued)

FOREIGN PATENT DOCUMENTS

CN 101052818 A 10/2007
CN 103867555 A 6/2014
(Continued)

OTHER PUBLICATIONS

Ackroyd, Daniel., Strength, Rigidity & Hardness—What's the difference? Feb. 14, 2018, [online], [retrieved on Aug. 27, 2019]. Retrieved from the Internet <https://www.accu.co.uk/en/p/111-strength-rigidity-hardness-difference> (Year: 2018).*
(Continued)

*Primary Examiner* — Greg Binda
(74) *Attorney, Agent, or Firm* — Crowell & Moring LLP

(57) ABSTRACT

A connection device for a joint shaft in a motor vehicle includes an axis of rotation, a first connection area for connecting the connection device to a drive train element, a predetermined breaking region, and a tube region which connects directly to the predetermined breaking region. The connection device has an axial extension in the direction of the axis of rotation, and a radial extension orthogonal to the axis of rotation and is designed, at least substantially, as a tubular hollow body. The predetermined breaking region is arranged between the first connection region and the tube region in the axial direction. A connection area is arranged in the axial direction between the first connection region and the predetermined breaking region.

16 Claims, 1 Drawing Sheet

(51) Int. Cl.
*F16D 1/08* (2006.01)
*F16D 1/10* (2006.01)

(58) Field of Classification Search
USPC .......................................................... 464/183
See application file for complete search history.

(56) References Cited

U.S. PATENT DOCUMENTS

| | | | |
|---|---|---|---|
| 6,371,859 B1* | 4/2002 | Gibson | F16C 3/02 |
| | | | 464/183 |
| 10,012,259 B2* | 7/2018 | Morlock | B21K 1/063 |
| 2006/0079335 A1 | 4/2006 | Muskus et al. | |
| 2008/0012329 A1 | 1/2008 | Dewhirst | |
| 2014/0161509 A1 | 6/2014 | Choi et al. | |
| 2016/0003304 A1 | 1/2016 | Streinz et al. | |

FOREIGN PATENT DOCUMENTS

| | | |
|---|---|---|
| DE | 42 40 237 A1 | 6/1994 |
| DE | 196 45 227 A1 | 5/1998 |
| DE | 10 2013 204 181 A1 | 9/2014 |
| KR | 10-2014-0083331 A | 7/2014 |

OTHER PUBLICATIONS

International Search Report (PCT/ISA/210) issued in PCT Application No. PCT/EP2016/059745 dated Aug. 11, 2016 with English translation (five pages).
Chinese-language Office Action issued in counterpart Chinese Application No. 201680007627.7 dated Dec. 17, 2018 with partial English translation (seven (7) pages).

\* cited by examiner

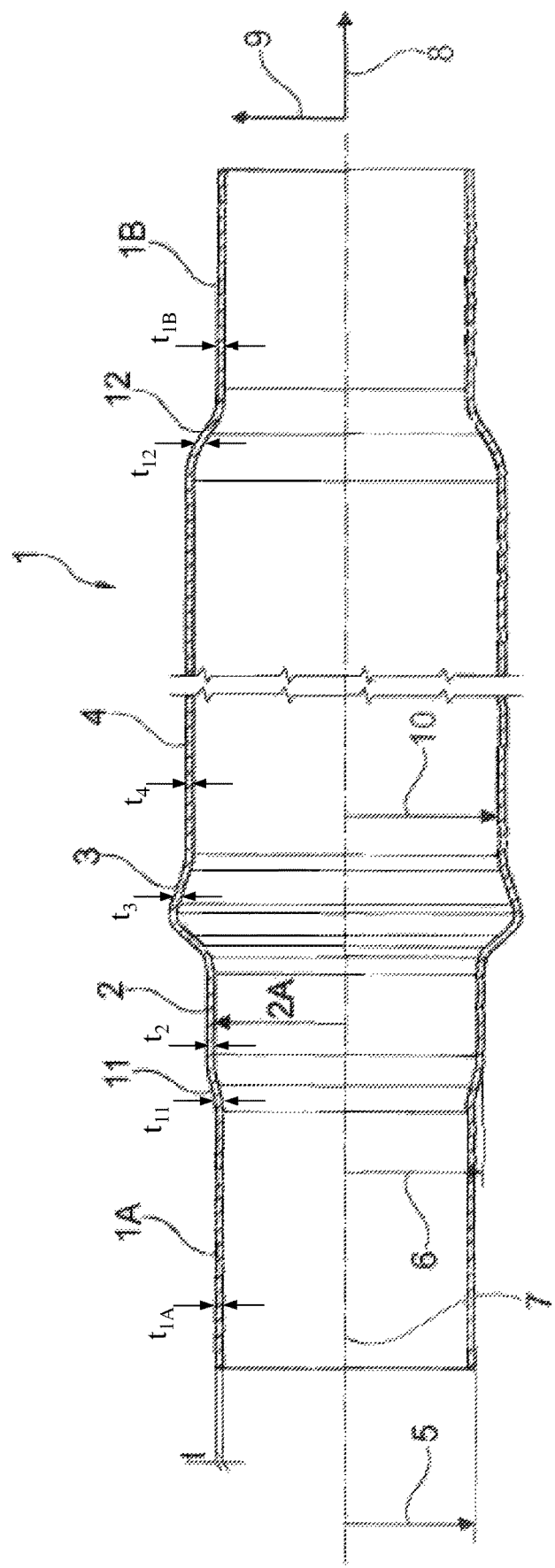

CONNECTION DEVICE FOR A DRIVE TRAIN

CROSS REFERENCE TO RELATED APPLICATIONS

This application is a continuation of PCT International Application No. PCT/EP2016/059745, filed May 2, 2016, which claims priority under 35 U.S.C. § 119 from German Patent Application No. 10 2015 209 110.4, filed May 19, 2015, the entire disclosures of which are herein expressly incorporated by reference.

BACKGROUND AND SUMMARY OF THE INVENTION

The present invention relates to a connection device for a drive train. Connection devices are generally known, for example, from DE 10 2013 204 181 A1.

The invention is described below with reference to a connection device for a motor vehicle drive train. But, this is not to be construed as a limitation of the invention.

In a motor vehicle, in particular an automobile having a front engine and rear-wheel drive or four-wheel drive, the drive motor is arranged at some distance from the driven rear axle and the drive power provided by the drive motor has to be transferred to the driven axle by means of a drive train. The same problem essentially arises in the case of a rear engine with front-wheel drive or four-wheel drive. Owing to the transferred drive powers, the drive train, and in particular a cardan shaft pertaining thereto and extending in the longitudinal direction of the vehicle, has a relatively high rigidity in the longitudinal direction of the vehicle.

When energy is absorbed through the deformation of body parts and the vehicle structure, this rigidity of the drive train is disruptive. Here, rigidity refers to the rigidity with regard to the telescoping (compression) of the connection device. Such cardan shafts are formed with predetermined breaking points or displacement pieces in particular for this reason.

In the event of a deformation of the cardan shaft, the cardan shaft fails as intended at its predetermined breaking point and telescopes without a notable further application of force. Such a device is described in DE 10 2013 204 181 A1. Here, the connection device has a bead which, upon exceeding a predetermined longitudinal load, a load in the direction of the axis of rotation of the cardan shaft, fails as intended and enables the connection device to telescope into itself. The design of the predetermined breaking point and the geometry adjoining this has an effect on the operating behavior, such as the rigidity and the natural frequency, in particular the torsional rigidity and the natural bending frequency.

It is the object of the invention to provide a connection device with an improved operating behavior over that of connection devices known from the prior art.

This and other objects are achieved by a connection device in accordance with embodiments of the invention.

A connection device according to the invention is designed for use in a motor vehicle. This connection device here is formed in such a way that a first and a second drive train element can be connected to each other by the connection device.

Within the context of the invention, a drive train element refers in particular to a shaft, a transmission input or output, a clutch or a torque converter or the like. At least one of these drive train elements is preferably connected to the connection device with form fit, friction fit, material fit or with a combination of at least two of the above-mentioned connection types.

The connection device extends along an axis of rotation. The connection device here is rotatable about this axis of rotation during the intended operation for transferring drive power. The connection device further preferably has a geometry which is rotationally symmetrical, at least in part, with respect to the axis of rotation.

The connection device preferably has a first connection region for connecting it to the drive element. The first connection region as well as a tube region and a connecting region and a second connection region refer to regions of the connection device wherein the surface is arranged such that it is parallel, in part or preferably completely, to the axis of rotation.

The first connection region here preferably has an at least substantially hollow cylindrical basic form. With regard to the basic form, it should be understood within this context that geometrical deviations from the hollow cylindrical basic form, in particular with a circular cross-sectional area, are provided for torque transfer or for connection to the drive train element. In particular, such deviations refer to recesses or a polygonal profile. Figuratively speaking, a shaft with a splined or toothed shaft connection also has a cylindrical basic form in the region of this connection, the teeth or splines of the connection which are designed for torque transfer being formed by recesses and realizing the deviation from the cylindrical basic form.

In addition to the connection region, the connection device has the tube region. This tube region preferably also refers to a region of the connection device with an at least substantially hollow cylindrical basic form, in particular with a circular cross-sectional area. The tube region further preferably refers to a hollow cylindrical region which further preferably directly adjoins a predetermined breaking region.

The connection device further has a predetermined breaking region. Such a predetermined breaking region is arranged between the first connection region and the tube region, and connects these two regions to each other. The predetermined breaking region is preferably formed as an outwardly curved bead. The geometry of the predetermined breaking region here is selected in such a way that the connection between the connection region and the tube region fails under a predetermined load in the direction of the axis of rotation.

The tube region as well as the connection region and the connecting region can preferably be described by a respective inner and outer sheathing cylinder. The sheathing cylinders are defined in particular by the axis of rotation of the connection device since the axis of rotation coincides with the cylinder axis. The cylinder diameter for the outer sheathing cylinder is determined by the greatest radial extent of an outer surface of the respective region, i.e. the greatest spacing of this surface (outer surface) from the axis of rotation. The cylinder diameter for the inner sheathing cylinder is determined by the smallest radial spacing of the inner surface, i.e. the shortest spacing of this surface (inner surface) from the axis of rotation. With a cylindrical design having a circular cross-sectional surface of such a region, its inner/outer surface coincides with the respective sheathing cylinder.

The inner sheathing cylinder of the tube region preferably has a diameter which is greater than a diameter of the outer sheathing cylinder of the connection region. By selecting the geometry in this way, it is ensured in particular that the connection region can be displaced into the tube region, i.e.

in the direction of the axis of rotation (longitudinal direction), in the manner of a telescope, in particular following the intentional failure of the predetermined breaking region.

The connecting region is further arranged between the predetermined breaking region and the connection region in the axial direction, i.e. in the direction of the axis of rotation. This connecting region can be described by an inner and an outer sheathing cylinder in the same way as the connection region and the tube region.

This connecting region here is preferably formed as a hollow body, preferably as a hollow cylindrical body. The connecting region is preferably delimited radially inwards by an inner surface and radially outwards by an outer surface. The connecting region is further preferably designed in such a way that the diameter of the inner sheathing cylinder of the connecting region is greater than the diameter of the outer sheathing cylinder of the connection region and, at the same time, the diameter of the outer sheathing cylinder of the connecting region is smaller than the diameter of the inner sheathing cylinder of the tube region.

In particular, such a design of the connection device enables the natural bending frequency to be increased, in particular through the connecting region, and the operating behavior to thereby be improved. The connecting region, in particular, further enables the degree of deformation to be reduced, at least in some regions, and the manufacturability of the connection device to thereby be improved.

In particular, in the event that the predetermined breaking region fails as intended under an axial load, the gradation of the diameter of the sheathing cylinder enables the guidance during the telescoping of the connection device to be improved and an improved connection device to therefore be realized.

In a preferred embodiment, the predetermined breaking region is formed as a radially outwardly curved connection between the tube region and the connection region (bead). The predetermined breaking region here can preferably be manufactured using a non-cutting forming procedure. The predetermined breaking region further preferably has tangential transitions from the tube region into the predetermined breaking region and from the connecting region into the predetermined breaking region. In particular, such a non-cutting forming procedure enables an uninterrupted fiber flow of the material fibers, and a particularly easily predictable breaking behavior at the predetermined breaking point can thus be achieved.

In a preferred embodiment, a second connection region adjoins the tube region in the axial direction. In a further preferred embodiment, the connection device is integrally molded directly on a second drive train element or can be connected thereto with material fit.

The second connection region here is preferably designed for connecting to a further drive train element. The connection device is therefore designed in particular for the torque-conducting connection between two drive train elements, for example a manual transmission output or automatic transmission output and an axle transmission input. This second connection region is further preferably designed for form-fitting, force-fitting, material-fitting connection or for a connection using at least two of the above-mentioned connection types. This connection region is preferably formed as part of a shaft hub connection. In particular, it is particularly simply possible to provide the connection device between two drive train elements using a second connection region.

In a preferred embodiment, the connection device is constructed, at least in part or completely, as a thin-walled component, preferably as a thin-walled sheet metal component, in particular, with a tubular design. Within the context of the invention, "thin-walled" refers to the features that the connection device preferably has, at least in part, preferentially completely, a mean wall thickness which is greater than 0.5 mm, preferably greater than 0.75 mm, preferentially greater than 1.25 mm and particularly preferentially greater than 1.75 mm and this wall thickness is further smaller than 5 mm, preferably smaller than 4 mm, preferentially smaller than 3 mm and particularly preferentially smaller than 2.25 mm. The connection device further preferably has different wall thicknesses from the above-mentioned range in different regions. Test results have shown that, with the wall thicknesses indicated above, a particularly light component can be manufactured on the one hand and the forces which occur can be reliably transferred on the other hand.

In a preferred embodiment, the connection device has a steel material as a component or is composed of a steel material. The connection device further preferably has an aluminum alloy as a component or is composed of such an aluminum alloy. A particularly stable connection device can be realized in particular with a connection device made of a steel material. A particularly light connection device can be realized in particular with a connection device made of an aluminum alloy.

In a preferred embodiment, at least one of the following regions of the connection devices has a hollow cylindrical basic form. A plurality of the following regions, and preferentially all of the regions mentioned below, preferably have a hollow cylindrical basic form, preferably with a circular cross-sectional area. In particular, the first connection region, the second connection region, the connecting region and the tube region are regions of the connection device which can have a hollow cylindrical basic form. In this case, the axis of rotation of the connection device, about which this latter is rotatable during the intended operation and which defines the longitudinal direction of the connection device, forms the cylinder axis for this hollow cylindrical basic form or coincides with this cylinder axis. The cross-sectional area of such a hollow cylinder is preferably a circular area or a polygonal area having "a plurality of corners," wherein "a plurality" refers to four or more corners, preferentially twelve or more and particularly preferentially twenty four or more corners. Corners preferably do not refer to straight lines or planar surfaces meeting at a sharp angle, but can, accordingly, instead have transition radii. In particular, such base bodies have favorable properties for torque transfer.

The first connection region is preferably connected to the connecting region by a first tapering region and the connecting region is preferably connected to the tube region via the predetermined breaking region. The axial rigidity of the predetermined breaking region, i.e. the rigidity in the direction of the axis of rotation, is further preferably lower than the rigidity of the tapering region in the same direction. The strength of the predetermined breaking region in this direction is also further preferably lower than the strength of the tapering region in this direction. Such a design results in particular in that, in the event of a load on the connection device in the direction of the axis of rotation, the predetermined breaking region is deformed before such a deformation occurs at the tapering region. It can also further be achieved with this design that the predetermined breaking region fails under an axial load before the tapering region fails.

The second connection region can preferably be connected to the tube region by a second tapering region. The axial rigidity of the predetermined breaking region in the direction of the axis of rotation is further preferably lower than the rigidity of the second tapering region in the same direction. The strength of the predetermined breaking region in this direction is also further preferably lower than the strength of the second tapering region in this direction.

The predetermined breaking region particularly preferentially has the lowest rigidity of the connection device in the direction of the axis of rotation and further preferably also the lowest strength.

In particular, with such a design of the connection device, the intentional deformation and failure behavior of the connection device can be achieved with a predetermined load in the direction of the axis of rotation.

The rigidity, and further preferably also the strength in the direction of the axis of rotation, can preferably be influenced by the dimensioning of the bending radii and wall thickness in the predetermined breaking region or in at least one or both of the tapering regions.

Other objects, advantages and novel features of the present invention will become apparent from the following detailed description of one or more preferred embodiments when considered in conjunction with the accompanying drawing.

BRIEF DESCRIPTION OF THE DRAWING

The Figure shows a longitudinal sectional view of a connection device.

DETAILED DESCRIPTION OF THE DRAWINGS

The Figure shows a longitudinal sectional view of a connection device 1 for a shaft in a motor vehicle, in particular a cardan shaft. Here, the connection device 1 has a first connection region 1A, a connecting region 2, a predetermined breaking region 3, a tube region 4 and a second connection region 1B. The connection device 1 is rotatable about the axis of rotation 7 so that speed and torque may be transferred thereby upon a rotation about the axis of rotation 7. The connection device 1 further has a circular cross-section in a sectional plane (not illustrated) which is arranged orthogonally to the axis of rotation 7. The connection regions 1A and 1B are designed for transferring torque to the drive train elements (not illustrated) and formed as hub portions. The design of the predetermined breaking region 3 is based on the predetermined axial forces, i.e., forces in the direction of the axis of rotation 7 under which the connection device 1 should break off/fail as intended. The connection device 1 has a radial extent in the orthogonal direction 9 to the axis of rotation 7 and axial extents in the longitudinal direction 8 of the axis of rotation 7. The connection device 1 has a substantially constant mean wall thickness t.

Wall thicknesses which deviate slightly from the mean wall thickness t can be produced in particular in the region of bends. To enable an intentional telescoping of the regions 1A, 2, 4 into one another, a particular diameter gradation of these regions is required. It is important here that the greatest outer radial extent 5 of the first connection region 1A is smaller than the smallest radial extent 10 of the inner surface of the tube region 4.

Test results have shown that a radial extent 6 of the connecting region 2 which is between the radial extent 5 and the radial extent 10 enables a particularly reliable function of the connection device 1 to be achieved, in particular during the intentional failure of the predetermined breaking region 3. It is further advantageous if even the smallest inner radial extent 2A of the connecting region 2 is greater than the greatest outer radial extent 5 of the first connection region 1A.

The first tapering region 11 is arranged between the first connection region 1A and the connecting region 2. The rigidity of the tapering region 11 in the direction of the axis of rotation 7 is greater than the rigidity of the predetermined breaking region 3, which is formed as a bead between the connecting region 2 and the tube region 4, in the same direction. The rigidity of the predetermined breaking region 3 in this direction is further lower than the rigidity of the second tapering region 12 between the tube region 4 and the second connection region 1B. The strengths of the regions 11, 12, 4 have the same behaviors as their rigidities so that, under an axial load in the direction of the axis of rotation 7, the predetermined breaking region 3 fails as intended before other regions of the connection device 1, in particular the tapering regions 11, 12 fail. The failure here refers to the breaking or separation of the connection device 1.

In at least one embodiment, the second connection region 1B adjoins the tube region 4 in the axial direction. The connection device 1 may be integrally molded directly on a second drive train element (not illustrated) or can be connected thereto with material fit. The second connection region 1B may also be designed for connecting to a further drive train element (not shown). The connection device 1 may therefore be designed for the torque-conducting connection between two drive train elements, for example a manual transmission output or automatic transmission output and an axle transmission input. The second connection region 1B is further preferably designed for form-fitting, force-fitting, material-fitting connection or for a connection using at least two of the above-mentioned connection types. The connection region 1B is preferably formed as part of a shaft hub connection. In particular, it is particularly simply possible to provide the connection device between two drive train elements using the second connection region 1B.

In a at least one embodiment, the connection device is constructed, at least in part or completely, as a thin-walled component, preferably as a thin-walled sheet metal component, in particular, with a tubular design. Within the context of the invention, "thin-walled" refers to the features that the connection device preferably has, at least in part, preferentially completely, a mean wall thickness which is greater than 0.5 mm, preferably greater than 0.75 mm, preferentially greater than 1.25 mm and particularly preferentially greater than 1.75 mm and this wall thickness is further smaller than 5 mm, preferably smaller than 4 mm, preferentially smaller than 3 mm and particularly preferentially smaller than 2.25 mm. The connection device further preferably has different wall thicknesses $t_{1A}$, $t_{11}$, $t_2$, $t_3$, $t_4$, $t_{12}$, $t_{1B}$, from within the above-mentioned range, in different regions, respectively. Test results have shown that, with the wall thicknesses indicated above, a particularly light component can be manufactured on the one hand and the forces which occur can be reliably transferred on the other hand.

In a preferred embodiment, the connection device 1 has a steel material as a component or is composed of the steel material. The connection device 1 further preferably has an aluminum alloy as a component or is composed of such aluminum alloy. A particularly stable connection device can be realized with a connection device 1 made of steel material. A particularly light connection device can be realized with a connection device made of aluminum alloy.

In a preferred embodiment, at least one of the regions of the connection devices has a hollow cylindrical basic form. A plurality of the regions, and preferentially all of the regions, have a hollow cylindrical basic form, preferably with a circular cross-sectional area. In particular, the first connection region 1A, the connection region 2, the second connecting region 1B and the tube region 4 are such regions of the connection device 1 which may have the hollow cylindrical basic form. In this case, the axis of rotation 7 of the connection device, about which this latter is rotatable during the intended operation and which defines the longitudinal direction of the connection device, forms the cylinder axis for this hollow cylindrical basic form or coincides with this cylinder axis. The cross-sectional area of such a hollow cylinder is preferably a circular area or a polygonal area having a plurality of corners, such as four or more corners, preferentially twelve or more and particularly preferentially twenty-four or more corners. In particular, such base bodies have favorable properties for torque transfer.

The first connection region 1A is preferably connected to the connecting region 2 by a first tapering region and the connecting region 2 is preferably connected to the tube region 4 via the predetermined breaking region 3. The axial rigidity of the predetermined breaking region 3, i.e. the rigidity in the direction of the axis of rotation 7, is further preferably lower than the rigidity of the first tapering region 11 in the same direction. The strength of the predetermined breaking region 3 in this direction is also further preferably lower than the strength of the first tapering region 11 in this direction. Such a design results in particular in that, in the event of a load on the connection device 1 in the direction of the axis of rotation 7, the predetermined breaking region 3 is deformed before such a deformation occurs at the first tapering region 11. It can also further be achieved with this design that the predetermined breaking region 3 fails under an axial load before the first tapering region 11 fails.

The second connection region 1B can preferably be connected to the tube region 4 by a second tapering region 12. The axial rigidity of the predetermined breaking region 3 in the direction of the axis of rotation is further preferably lower than the rigidity of the second tapering region 12 in the same direction. The strength of the predetermined breaking region 3 in this direction is also further preferably lower than the strength of the second tapering region 12 in this direction.

The predetermined breaking region 3 preferably has the lowest rigidity of the connection device 1 in the direction of the axis of rotation and further preferably also the lowest strength. In particular, with such a design of the connection device 1, the intentional deformation and failure behavior of the connection device 1 can be achieved with a predetermined load in the direction of the axis of rotation. The rigidity, and further preferably also the strength in the direction of the axis of rotation, can preferably be influenced by the dimensioning of the bending radii and wall thickness in the predetermined breaking region 3 or in at least one or both of the tapering regions 11, 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connection device for a shaft in a motor vehicle, comprising:
an axis of rotation;
a first connection region for connecting the connection device to a drive train element;
a predetermined breaking region; and
a tube region which directly adjoins the predetermined breaking region,
wherein the connection device has an axial extent in an axial direction of the axis of rotation and a radial extent orthogonal thereto and is formed at least in part as a tubular hollow body,
wherein the predetermined breaking region is arranged between the first connection region and the tube region in the axial direction,
wherein a connecting region is arranged in the axial direction between the first connection region and the predetermined breaking region,
wherein the greatest outer radial extent of the first connection region is smaller than the greatest outer radial extent of the connecting region,
wherein the greatest outer radial extent of the connecting region is smaller than the smallest inner radial extent of the tube region,
wherein at least one of: the first connecting region, the breaking region, the tube region, and a tapering region, has a different wall thickness than at least one other of: the first connecting region, the breaking region, the tube region, and a tapering region,
wherein there is an uninterrupted material fiber flow between the tube region, the breaking region and the connecting region, and
wherein the predetermined breaking region is formed as a radially outwardly curved connection between the tube region and the connecting region.

2. The connection device according to claim 1, wherein the greatest outer radial extent of the first connection region is smaller than the smallest inner radial extent of the connecting region.

3. The connection device according to claim 1, further comprising:
a second connection region which adjoins the tube region in the axial direction, wherein
the second connection region, relative to the first connection region, is arranged on an opposite side of the predetermined breaking region and
the second connection region is provided for connecting to another drive train element.

4. The connection device according to claim 3, wherein the second connection region has a hollow cylindrical body.

5. The connection device according to claim 1, wherein the connection device has, at least in part, a wall thickness which is greater than 0.5 mm and smaller than 5 mm.

6. The connection device according to claim 5, wherein the wall thickness is greater than 0.75 mm and smaller than 4 mm.

7. The connection device according to claim 6, wherein the wall thickness is greater than 1.25 mm and smaller than 3 mm.

8. The connection device according to claim 7, wherein the wall thickness is greater than 1.75 mm and smaller than 2.25 mm.

9. The connection device according to claim 1, wherein the connection device has, at least in part, a wall thickness which is greater than 1.75 mm and smaller than 2.25 mm.

10. The connection device according to claim 9, wherein all of the first connection region, the connecting region, and the tube region have a hollow cylindrical body.

11. The connection device according to claim 1, wherein the connection device has a steel material as a component or is composed of a steel material.

12. The connection device according to claim 1, further comprising:
- at least one of the first connection region, the connecting region, and the tube region has a hollow cylindrical body.

13. The connection device according to claim 12, wherein all of the first connection region, the connecting region, and the tube region have a hollow cylindrical body.

14. The connection device according to claim 1, wherein
- a first tapering region is arranged between the first connection region and the connecting region, and
- a rigidity of the predetermined breaking region in the axial direction is lower than a rigidity of the first tapering region.

15. The connection device according to claim 1, wherein
- a first tapering region is arranged between the first connection region and the connecting region, and
- a strength of the predetermined breaking region in the axial direction is lower than a strength of the first tapering region.

16. The connection device according to claim 1, wherein the shaft in the motor vehicle is a cardan shaft.

* * * * *